Jan. 24, 1961  G. A. LYON  2,969,257
WHEEL COVER
Filed Sept. 20, 1956
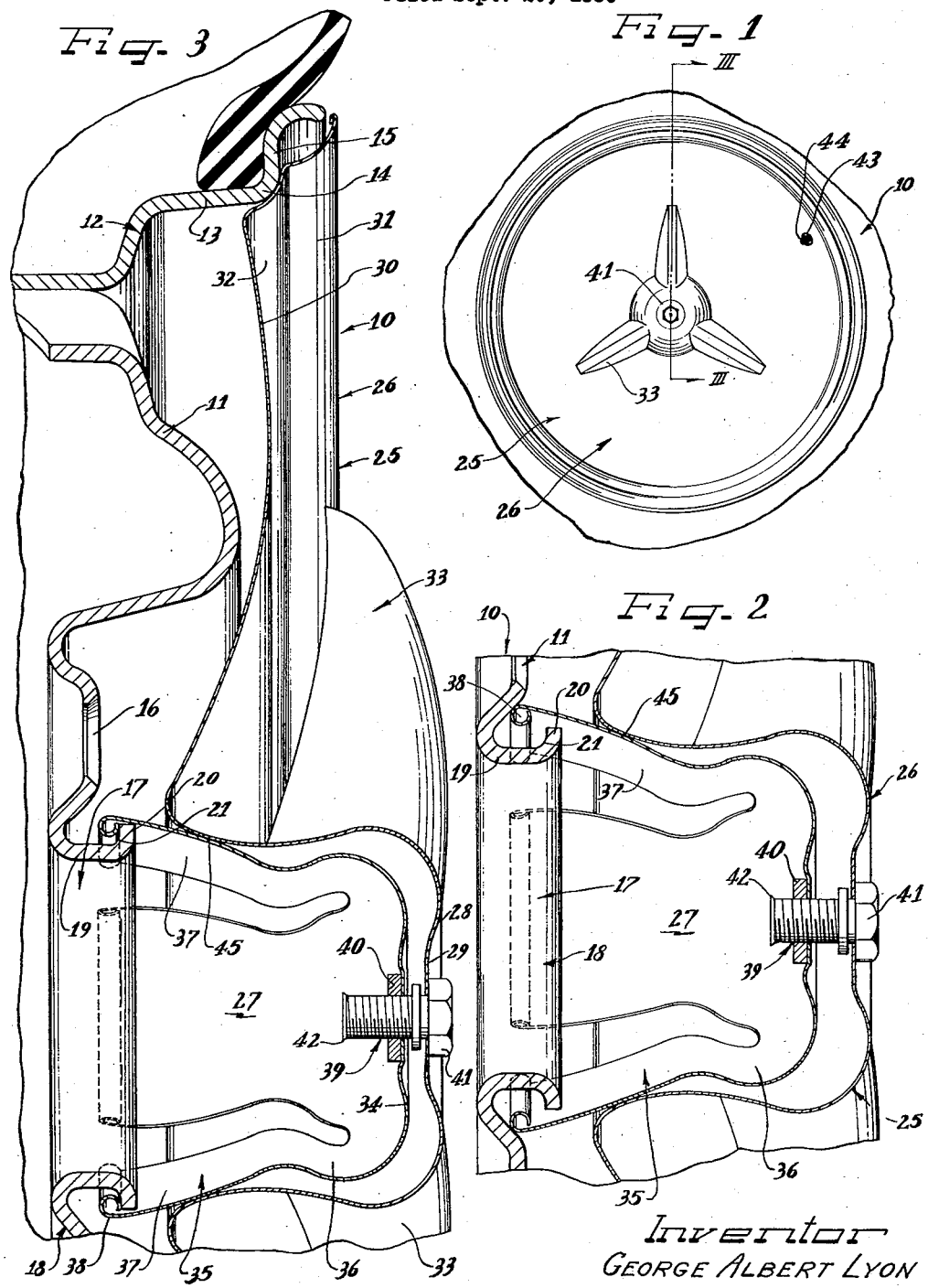
Inventor
GEORGE ALBERT LYON United States Patent Office 2,969,257
Patented Jan. 24, 1961

2,969,257
WHEEL COVER
George Albert Lyon, 13881 W. Chicago, Blvd., Detroit, Mich.
Filed Sept. 20, 1956, Ser. No. 610,923
8 Claims. (Cl. 301—37)

This invention relates generally to a wheel structure for an automobile vehicle and the like and more particularly to a new cover structure and its manner of cooperation with the vehicle wheel.

Owners of automobiles and the like have been constantly plagued by thieves who prey upon them by stealing the wheel covers from the wheels of their automobile or other vehicles. This problem is particularly distressing today since many of the automobile manufacturers have resorted to very fancy and expensive types of wheel covers to ornament their particular automobiles and as a consequence when one is lost by the owner he has suffered a considerable loss.

Accordingly, an object of this invention is to provide a new and improved cover structure which is adapted to effectively cooperate with a vehicle wheel and yet lends itself to being fitted with a locking device to prevent thievery.

Still another object of this invention is to provide a wheel cover structure of the above mentioned type which lends itself to economical manufacture on a large production basis.

A further object of this invention is to provide a new inter-action between inner and outer cover members such that the inner cover member is caused to be detachably engageable with the body part of a vehicle wheel.

According to the general features of this invention there is provided in a wheel structure including a wheel inner and outer cover members connected together by connecting means with the outer cover having a shoulder and with the inner cover member having a plurality of resiliently deflectable extensions with gripping portions deflectable by the shoulder into cover retaining engagement with the wheel upon operation of the connecting means causing the extensions to deflect the gripping portions into gripping engagement with the wheel, the extensions each having generally radially and axially inwardly extending portions each connected to generally radially outwardly axially inwardly extending portions terminating in the gripping portions with the shoulder bearing against the radially outwardly axially inwardly extending portions, the wheel having shoulder means on its body part and with the gripping portions engageable therebehind.

Other objects and features of this invention will more fully become apparent in view of the following detailed description taken in conjunction with the accompanying drawing illustrating a single embodiment and in which:

Figure 1 is a side elevation of my wheel structure;

Figure 2 is a fragmentary enlarged cross-sectional view highlighting the manner in which my cover structure cooperates with the vehicle wheel; and Figure 3 is an enlarged fragmentary cross-sectional view taken substantially on the line III—III of Figure 1, looking in the direction indicated by the arrows, the arm being shown in elevation, and showing the cover structure in assembly upon the vehicle wheel.

As shown on the drawings:

The reference numeral 10 indicates generally my wheel structure which includes a body part 11 and a multi-flanged drop center type of tire rim 12 which has an intermediate axial flange 13 junctioned at 14 to outer margin 15 of the tire rim 12. The tire rim 12 may be suitably connected to the body part 11 such as by welding and the like. The body part is adapted to be attached to the axle of an automobile wheel axle by means of inserting lugs (not shown) through aperture 16 on the body part and by threading nuts (not shown) onto the lugs to clamp the body part to the axle. Disposed radially inwardly of the aperture 16 is provided a central opening 17 which is bounded by an annular goose necked flange 18. The flange 18 includes a generally axially outwardly extending flange portion 19 and terminates in a generally radially outwardly extending flange portion 20 with there being defined between these flange portions 19 and 20 an annular shoulder 21.

Cooperable with the wheel is my novel cover structure 25 which includes inner and outer cover members 26 and 27. The cover member 26 has a raised central or hub area or cover area 28 and includes a central dished portion 29. Extending radially outwardly from the area 28 is an axially outwardly bulged cover portion 30 which is joined to outer margin 31 of the cover. Between the intermediate curved or bulged portion 30 and the margin 31 is a dished portion bottoming area 32 which is adapted to be seated against tire rim junction 14 when the cover is in an assembly upon the wheel. To ornament the outer cover member 26 arms 33 have been suitably attached to the area 28 and project generally radially outwardly therefrom.

The inner cover member 27 comprises generally a cap and includes a central crown portion 34. Connected to the crown portion 34 at circumferentially spaced intervals are a plurality of generally axially inwardly extending resiliently deflectable retaining extensions 35 each of which is separated from an adjacent extension by a notch or groove or slit. The extensions 35 include generally radially and axially inwardly extending portions 36 and terminate in elongated generally axially inwardly radially outwardly extending portions 37 each having a beaded extremity 38.

The cover members 26 and 27 are connected together by connecting means 39. The connecting means comprises a nut 40 which is fixedly connected to the inner cover member 27 by means of welding and the like and a bolt 41 which is loosely interlocked to the outer cover member 26. The inner and outer cover members are assembled together by rotating and threading the bolt 41 into the bore of the nut 40. It will be noted the bolt 41 has an enlarged head 42 at its free end to insure that the cover members will not come apart after they have been assembled together.

To assemble the cover upon the wheel, the valve stem 43 of wheel supported pneumatic tire assembly is aligned with respect to cover opening 44 and upon urging the cover axially inwardly the beaded terminals 38 are engaged in the pocket defined by the gooseneck flange 19 of the body part 11 as is shown in Figure 2. Upon turning of the bolt 41 the inner cover member 27 is drawn axially outwardly with the result that the resiliently deflectable extensions 35 are contracted in such a manner that the beaded terminals 38 are retainingly engaged behind the shoulder 21. This action is brought about as a result of the extension portions 37 being deflected radially inwardly as they bear against a cover area or annular shoulder 45 of the outer cover member 26. To release the cover from the wheel the bolt 41 is merely turned in an opposite direction with the result that the tension between the extensions 35 and the annular shoulder 45 is reduced to an extent to allow the beaded terminals 38 to disengage from behind the shoulder 21.

The inner and outer cover members may be made from any suitable material although it will be appreciated the extensions 35 may preferably comprise a resilient material such as spring steel so that they may resiliently deflect in the manner above described.

A suitable key operated locking device may be assembled on the cover structure 25 and may overlie the bolt 41 to insure that the bolt 41 cannot be tampered with.

It will be understood that modifications and variations may be effected without departing from the scope of the novel concepts of the present invention.

I claim as my invention:

1. In a wheel structure, a wheel including rim and body parts with the body part having shoulder means, a cover structure including axially inner and axially outer cover members, the inner cover member having a central crown portion and a series of circumferentially spaced retaining extensions connected to the crown portion and arranged in a circle having a diameter slightly in excess of the diameter of the shoulder means, the outer cover member having a hub area with the crown portion on the inner cover member telescoped therein, the hub area having a cover area for engagement with the circumferentially spaced retaining extensions, the outer cover member extending radially outwardly from the cover area and having a bottoming area in bottomed engagement against the wheel radially outwardly of the cover area, and connecting means joining the cover members together and said connecting means being adapted to cause relative axial movement between the cover members with the retaining extensions being thereby biasable against the cover area radially inwardly behind the shoulder means to sustain the cover structure in assembly with the wheel and to sustain the bottoming area in bottomed engagement against the wheel to thereby stabilize the cover structure when in assembly with the wheel.

2. The wheel structure of claim 1 further characterized by the connecting means comprising a bolt carried by the outer cover member and a nut fixedly carried on the underside of the inner cover member with the bolt extending into and cooperable with the threaded bore of the nut to cause relative axial movement between the cover members.

3. The wheel structure of claim 1 further comprised by the connecting means including a bolt telescoped through centrally located holes provided on the inner and outer cover members and with the bolt having its opposite ends enlarged to insure the continued assembly of the cover members.

4. The wheel structure of claim 1 further characterized by the extensions each having a generally radially and axially inwardly extending extension portion and a generally radially outwardly axially inwardly extending extension portion which portions are joined together and terminate in a gripping portion, the cover area being biasable against the generally radially outwardly axially inwardly extending portion.

5. The wheel structure of claim 4 further characterized by the radially outwardly axially inwardly extending portion having a radially inwardly underturned bead comprising the gripping portion.

6. In a wheel structure, a wheel including rim and body parts with the body part having shoulder means, a cover structure including axially inner and axially outer cover members, the inner cover member having a central crown portion and a series of circumferentially spaced retaining extensions connected to the crown portion and arranged in a circle having a diameter slightly in excess of the diameter of the shoulder means, the outer cover member having a central area, the central area being connected with a cover area for engagement with the circumferentially spaced retaining extensions, the outer cover member extending radially outwardly from the cover area and having a bottoming area in bottomed engagement against the wheel radially outwardly of the cover area, and connecting means joining the cover members together and said connecting means being adapted to cause relative axial movement between the cover members with the retaining extensions being thereby biasable against the cover area radially inwardly behind the shoulder means to sustain the cover structure in assembly with the wheel and to sustain the bottoming area in bottomed engagement against the wheel to thereby stabilize the cover structure when in assembly with the wheel.

7. The wheel structure of claim 6 further characterized by each of said extensions including a radially and axially inwardly extending portion and a radially outwardly and axially inwardly extending portion and with the cover area being biasable against the radially outwardly and axially inwardly extending portions to engage the extensions in assembly with the shoulder means.

8. The wheel structure of claim 6 further characterized by the body part having a central axle opening defined by an axial body part flange and with the flange carrying said shoulder means.

References Cited in the file of this patent

UNITED STATES PATENTS

| | | |
|---|---|---|
| 1,408,910 | Simenowsky | Mar. 7, 1922 |
| 2,108,145 | Short | Feb. 15, 1938 |
| 2,249,568 | Shinliver | July 15, 1941 |
| 2,386,245 | Lyon | Oct. 9, 1945 |
| 2,444,779 | Krasberg | July 6, 1948 |
| 2,660,478 | Lyon | Nov. 24, 1953 |

FOREIGN PATENTS

| | | |
|---|---|---|
| 279,319 | Italy | Nov. 8, 1930 |
| 492,840 | Great Britain | Sept. 28, 1938 |